(No Model.)

H. H. DILLE.
PAWL AND RATCHET MECHANISM.

No. 408,090. Patented July 30, 1889.

Witnesses
Chas. F. Williamson.
Henry C. Hazard.

Inventor
Henry H. Dille
by Prindle and Russell
his Attorneys

UNITED STATES PATENT OFFICE.

HENRY H. DILLE, OF RICHMOND, INDIANA.

PAWL-AND-RATCHET MECHANISM.

SPECIFICATION forming part of Letters Patent No. 408,090, dated July 30, 1889.

Application filed April 24, 1889. Serial No. 308,361. (No model.)

*To all whom it may concern:*

Be it known that I, HENRY H. DILLE, of Richmond, in the county of Wayne, and in the State of Indiana, have invented certain new and useful Improvements in Pawl-and-Ratchet Mechanism; and I do hereby declare that the following is a full, clear, and exact description thereof, reference being had to the accompanying drawings, in which—

Figure 1:
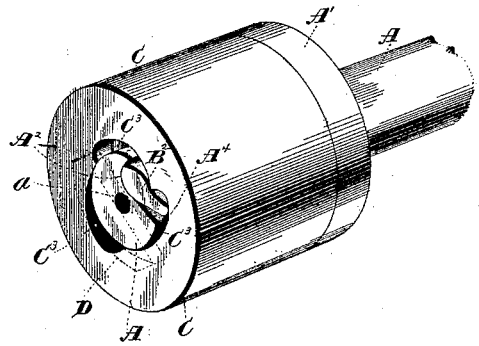
Figure 2:
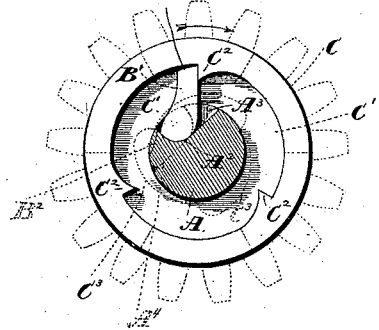
Figure 3:
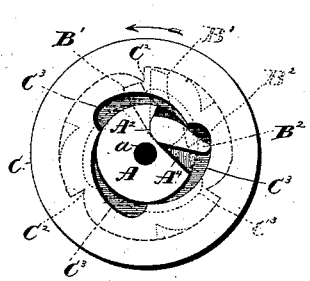
Figure 4:
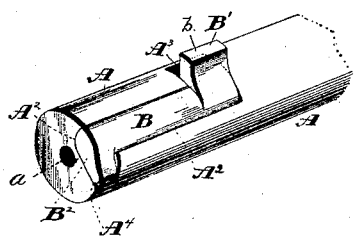
Figure 5:
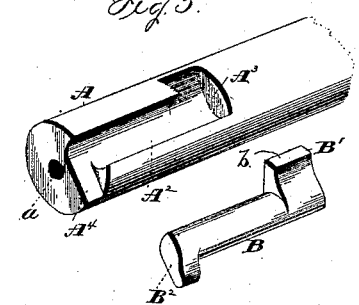

Figure 1 shows a perspective view of my pawl-and-ratchet mechanism; Fig. 2, a view of the same in end elevation, looking at the end opposite to that shown in Fig. 1, the collar on the shaft or arbor being removed; Fig. 3, a similar view looking at the other end, with the pawl in the same position as in Fig. 1; Fig. 4, a detail view of the shaft or arbor and pawl, with the ratchet and cam carrying barrel removed; Fig. 5, a detail perspective view showing the pawl and shaft separated, and Fig. 6 a detail perspective view of a modified form of pawl.

Letters of like name and kind refer to like parts in each of the figures.

The object of my invention is to provide an improved pawl-and-ratchet mechanism; and to this end my invention consists in the mechanism and in the construction, arrangement, and combination of the parts thereof, as hereinafter specified.

My invention relates to that class of pawl-and-ratchet devices in which the pawl is positively moved into ratchet-tooth-engaging position without the intervention of a spring or weight.

While I shall show my pawl-and-ratchet device as applied for connecting a shaft and rotary drum or barrel, I do not limit myself to such special application of my invention. It can be used in other combinations of elements wherever it is desired that one part shall be capable of rotating freely in one direction with reference to another, and that when such part tends to rotate in the other direction the two parts shall be locked together.

I contemplate using my pawl-and-ratchet mechanism wherever other pawl-and-ratchet devices are used, whether as a clutch between a pinion or pulley and a shaft, or between two shafts, or between a lever-arm and a shaft or pinion, or as a locking device to lock a rotary and stationary piece together when the rotary piece tends to turn in one direction with reference to the stationary piece.

In the drawings, A designates a shaft or arbor having the collar A'. In the periphery of the arbor is a longitudinal groove $A^2$, extending outward from a point at or near the outer side of collar A'. Close to such collar is an offset $A^3$ from one side of the groove, while at the other end and on the other side of the groove is a second offset $A^4$. Situated in said groove is the rock-shaft B, bearing on its inner end close to collar A' the pawl lug or arm B', projecting out from its side, substantially at right angles to the shaft, in position to rock down into the groove-offset $A^3$ by the turning of the rock-shaft in one direction. At the other end of the rock-shaft, and projecting out therefrom in a direction opposite to that of lug B', is the second lug or short arm $B^2$ adapted to be swung down into the groove-offset $A^4$, when the rock-shaft is rocked toward that side. The outer end of lug $B^2$ is preferably rounded or beveled, as shown, and the offset $A^4$ is of such size and depth that such lug can be swung down into the same, so as to be flush with or below the periphery of the shaft or arbor A. The outer end of the pawl lug B' is preferably beveled, as shown at *b*, on the side opposite to the groove-offset $A^3$.

Journaled upon and surrounding the grooved portion of the arbor or shaft A is the drum or sleeve C, whose inner end, abutting against the collar A', is recessed out, as shown at C', to allow swing of the pawl-lug B' as the rock-shaft B is turned in groove $A^2$. Around this recess are the inwardly-projecting ratchet-teeth $C^2$, which, as shown, are three in number. Such number can be increased or changed, as desired, without departure from my invention. These ratchet-teeth are so situated with reference to the periphery of shaft or arbor A as to stand in the path of the outer portion of lug B' when the rock-shaft B has been turned to cause such lug to stand outward, as shown in Fig. 2. The lug $B^2$ on the other end of the rock-shaft B' is then swung down into its respective groove-offset $A^4$ and bears against the bottom of such offset, as shown in Fig. 3, so as to form a stop to prevent further turning of the rock-shaft. The pawl-lug B′, having its abrupt face or side in engagement with the abrupt side of the ratchet-tooth, is thus held rigidly against backward turning by any pressure of the tooth against it. As indicated hereinbefore, the other side of the outer end of the pawl-lug is beveled or inclined. If, then, the shaft A or the drum or barrel C be turned the other way, so as to bring the inclined side of one of the ratchet-teeth in contact with the incline on the pawl-lug, such lug will be cammed downward and inward, turning the rock-shaft until the lug swings down into its groove-offset $A^3$, so as to let the ratchet-tooth pass its end. Such turning of the rock-shaft raises lug $B^2$ from its groove-offset $A^4$, so that its end projects above the periphery of shaft or arbor A. To allow this outward swing of lug $B^2$ as the pawl-lug B′ rides under and is forced down by the inclined face of a ratchet-tooth, the outer end of the barrel or sleeve C is provided with a series of recesses or notches $C^3$ $C^3$ around its shaft-receiving opening, such recesses being equal in number to the ratchet-teeth $C^2$. They are, as shown in the drawings, so situated with reference to the ratchet-teeth that one of them comes around over the lug $B^2$ just as the pawl-lug B′ on the other end of rock-shaft B comes into engagement with the inclined side of one of the ratchet-teeth, so as to be swung inward thereby. Each of these recesses is provided with an inclined face extending from the outer side of the recess inward toward the shaft or arbor opening in the barrel. These inclines, running in a direction opposite to the inclined faces of the ratchet-teeth, form cams to cam the lug $B^2$ inward after it has been swung outward by the engagement of the inclines on the ratchet-teeth with the pawl-lug B′.

As the barrel or the arbor is turned to bring the pawl-lug B′ into engagement with the inclined sides of the teeth, the rock-shaft B will be successively rocked in opposite directions by the alternate engagement of the lugs B′ and $B^2$ with the inclined sides of the ratchet-teeth and of the recesses $C^3$, respectively. As one of the ratchet-teeth passes out of engagement with the pawl-lug B′, the rock-shaft is rocked by the engagement of the cam or inclined face of one of the recesses $C^3$ with lug $B^2$, so as to swing the pawl-lug B′ out again into position to engage the abrupt side of the ratchet-tooth which it has just passed if the barrel should be turned in a direction to carry such side of the tooth toward the pawl-lug or the arbor should be moved to carry the lug back toward the tooth.

Figure 6:
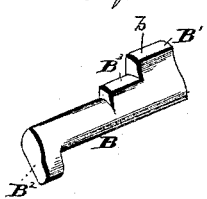

In Fig. 6 I show a modified form of the rocking-pawl device. In this form the rock-shaft B has the same lugs B′ and $B^2$ as before, but has in addition, close to pawl-lug B′, a lower rib or lug $B^3$, intended to engage and act in conjunction with a series of ratchet-teeth like those already described, but situated nearer the shaft or arbor A.

Any desired means for retaining the barrel or pinion C on the shaft can be made use of. In the drawings I show in dotted lines one form of retaining device, consisting of a cross-head D, fastened to the shaft or arbor by means of a stem entering the opening $a$ in the shaft end. Such cross-head at its ends overlaps the end of the barrel drum or pinion.

The operation of my pawl-and-ratchet device, which is apparent from the drawings and description hereinbefore given, is, briefly, as follows: In assembling the parts the rock-shaft B is first put in place in the shaft-groove $A^2$ and rocked, so that the lug $B^2$ lies down within the groove-offset $A^4$ at the outer end of the groove. The drum-sleeve, barrel, or pinion is then slid onto the shaft or arbor A over the lug $B^2$, which is flush with or below the shaft-periphery. After the barrel or other piece surrounding the shaft A has thus been placed in position with its series of ratchet-teeth over the inner end of the rock-shaft, and the series of recesses or cams in position to engage lug $B^2$ when the latter is swung to stand out beyond the shaft-periphery, the mechanism is assembled ready for action. If, now, the drum, pinion, or other rotary piece be turned in the direction of the arrows in Figs. 2 and 3, the pawl-lug B′ will be forced inward by the engagement of the inclined face of each ratchet-tooth engaging it, and then outward again by the engagement of one of the cams or inclines on recesses $C^3$ with lug $B^2$ after the pawl-lug has passed the engaging tooth. This swinging outward of the pawl-lug B′ after passing a ratchet-tooth brings it into position to engage squarely the abrupt side of a ratchet-tooth if the rotary piece C be turned back or in the direction opposite to the arrows.

As will be understood, it makes no difference with the operation of my pawl-and-ratchet device whether the piece C or the shaft A, or both, may be made rotary. The movement of one part with reference to the other in one direction will be free because of the riding of the pawl-lug over the inclined faces of the ratchet-teeth, while movement of the part in the other direction will be effectually checked by the engagement of the pawl-lug with the abrupt side of a ratchet-tooth.

If desired, the rock-shaft B, with its lugs B′ $B^2$, can be placed in a longitudinal groove in the sleeve or barrel, while the ratchet-teeth and the cams for engaging lug $B^2$ are placed or made in the shaft.

It is not necessary that a recess should be cut in the end of the barrel or sleeve C, or that there should be a rim or flange upon the inner side of which the ratchet-teeth are formed.

The portions of the outer side or annular wall of recess C′, which is defined or marked out by the radial dotted lines in Fig. 2, can be cut away so as to leave little or nothing but the ratchet-teeth themselves projecting from the barrel end.

The bottom of the offset $A^4$ serves as a stop to limit the inward swing of lug $B^2$. Such lug engaging the bottom of the offset, while the pawl-lug $B'$ stands out in position to engage the abrupt side of one of the ratchet-teeth, will effectually lock the shaft against turning in a direction to allow the pawl-lug to be swung back by the engagement of the abrupt side of the tooth. In other words, the pawl-lug when engaged by the abrupt side of a ratchet-tooth is held rigid by the engagement of the lug $B^2$ with the bottom of the groove-offset $A^4$.

Having thus described my invention, what I claim is—

1. In a pawl-and-ratchet device, in combination with the two parts movable with reference to each other, the one having a series of ratchet-teeth and the other having a series of cams, a rock-shaft having the two lugs or arms to engage, respectively, the ratchet-teeth and cams, substantially as and for the purpose specified.

2. In combination with an arbor or shaft and a piece surrounding the same, a longitudinally-arranged rock-shaft carried by one of the parts, provided with a lug on each end, and the ratchet-teeth and cams on the other part to engage the lugs, respectively, substantially as and for the purpose shown.

3. In combination with a shaft or arbor provided with the longitudinal groove, the rock-shaft in such groove, provided with the two lugs or arms, a sleeve or barrel surrounding the arbor and provided with a series of ratchet-teeth to engage one of the rock-shaft lugs, and a series of cams to engage the other lug, substantially as and for the purpose set forth.

4. In combination with the arbor and the longitudinally-arranged rock-shaft carried thereby, provided with oppositely-arranged lugs, and a barrel or sleeve around the arbor, provided at one end with a series of ratchet-teeth to be engaged by one of the lugs on the rock-shaft and at its other end with a series of cams to engage the other rock-shaft lug, substantially as and for the purpose described.

5. In combination with a shaft or arbor having the longitudinal groove, the rock-shaft in such groove, having the two lugs oppositely arranged, so that as the rock-shaft turns to swing one inward toward the arbor the other is swung outward, and a sleeve or barrel around the arbor having the series of ratchet-teeth to be engaged by one of the rock-shaft lugs and a series of cams to engage the other lug, substantially as and for the purpose specified.

6. In combination with the arbor having the longitudinal groove and the rock-shaft in such groove, having the pawl-lug, and a second lug or arm arranged with reference to the other, so that as one swings outward from the arbor the other is carried inward, the barrel or sleeve surrounding the arbor, having the series of inwardly-projecting ratchet-teeth for engaging the pawl-lug and the series of cams for engaging the other lug on the rock-shaft, such cams and ratchet-teeth being arranged with reference to each other so as to alternately engage their respective rock-shaft lugs, substantially as and for the purpose shown.

7. In a pawl-and-ratchet device, in combination with an arbor having the longitudinal groove, the rock-shaft in such groove provided with the two lugs so arranged thereon that as one moves outward from the arbor the other moves inward, a barrel or sleeve on the arbor, a series of ratchet-teeth thereon adapted to be engaged by one of the rock-shaft lugs when swung outward and a series of cams also on the barrel adapted to engage and force the other rock-shaft lug inward when the ratchet-teeth are out of engagement with their respective lugs, said arbor being provided with means for limiting the rotation of the rock-shaft when it has been turned to carry the ratchet-tooth-engaging lug outward, substantially as and for the purpose set forth.

8. In combination with the arbor and the longitudinally-arranged rock-shaft carried thereby, having the oppositely-projecting lugs, a barrel or sleeve around the arbor, having the series of inwardly-projecting ratchet-teeth in position to be engaged by one of the shaft-lugs, and a series of cams adapted to engage the other shaft-lug and force it inward when the other lug is out of engagement with the inclined faces of the ratchet-teeth, said arbor being provided with a suitable stop face or bearing to be engaged by the cam-engaging lug when the latter has been swung inward, substantially as and for the purpose described.

In testimony that I claim the foregoing I have hereunto set my hand this 11th day of April, A. D. 1889.

HENRY H. DILLE.

Witnesses:
BENJAMIN F. HARRIS,
CHARLES T. SEAMAN.